United States Patent Office 3,469,171
Patented Sept. 23, 1969

3,469,171
POWER RECTIFYING DEVICE INCLUDING HEAT EXCHANGE ARRANGEMENT
Jacques Toulemonde, Versailles, and Maurice Gallay, Aix-les Bains, France, assignors to Compagnie Generale d'Electricite, Paris, France
Filed Jan. 31, 1967, Ser. No. 612,930
Claims priority, application France, Jan. 31, 1966, 47,870
Int. Cl. H02m 7/00, 1/18; H01l 5/00
U.S. Cl. 321—8        7 Claims

ABSTRACT OF THE DISCLOSURE

A power rectifying device for very high voltages, made up of semiconductor elements connected in series and coordinated with heat exchangers and with capacitances and resistances, wherein the said heat exchangers are organized in such manner that they form the bearers of the said semiconductor elements and, at the same time, the capacitances and/or resistances coordinated with the said elements.

BACKGROUND OF THE INVENTION

Figure 1:
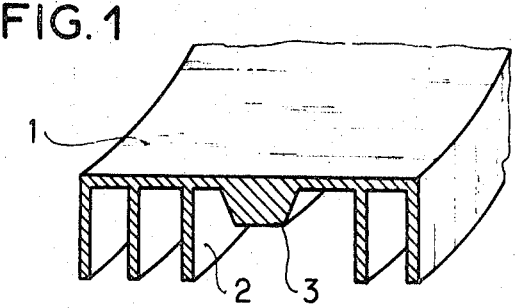

It is known that combinations of semiconductor elements, such as diodes or thyristors, connected in series may be employed for rectifying electrical voltages, for example, in the range of tens of thousands of volts at a current flow of several tens of amperes. However, many problems and special considerations arise in arranging combinations of this nature, such as: (1) the various individual elements must be insulated painstakingly, and the entire combination must be organized in such manner as to prevent leakage, such as leakage to earth and by corona discharge; (2) the voltage must be apportioned between the said elements in such a manner that it is impossible in any event for any one of them to be exposed to a greater voltage than that which it can withstand; (3) the said elements must be cooled; and (4) if the said elements are thyristors, a connection leading to its control electrode must be established.

It is known that voltages may be distributed in a uniform manner between the said elements by coordinating at least some of the latter with resistances and non-inductive capacitances.

It is also known that the semiconductor elements, in combination with their resistances and capacitances, may be arranged in the form of a helix on the periphery of a cylinder made of insulating material, and the whole may be cooled by circulation therethrough of a fluid, such as air or oil.

A combination of this nature has capacitances distributed with respect to earth, and it is known that when one of its terminals is energized by a high voltage relative to earth, the distribution of this voltage is not linear along the chain of rectifier elements, but the greater proportion of the voltage is borne by the leading elements, causing destruction of the latter. This shortcoming, however, can be eliminated effectively by employing a screen of the Faraday cage type, of which one extremity is connected electrically to one of the extreme terminals of the rectifying combination.

BRIEF DESCRIPTION OF THE INVENTION

The present invention has as its object a rectifying device made up of a combination of semiconductor elements, such as diodes or thyristors, situated between two metal components forming heat exchangers for the elements, this device providing the following inherent features, individually or in combination:

(1) The heat exchangers coordinated with the semiconductor elements are organized in such a manner that they not only form the physical support for the said elements, but, at the same time, due to their construction, they provide the capacitances and/or resistances to be associated with the said elements;

(2) Each heat exchanger carries the cathode of a first semiconductor element and the anode of a second semiconductor element, and the different heat exchangers are situated facing each other with reciprocal offset such that each semiconductor element has its cathode fastened to a heat exchanger and its anode fastened to the heat exchanger facing the first, thus forming a chain in which all the heat exchangers are insulated from each other and all the semiconductor elements are connected in series; and (3) Each heat exchanger comprises fins, the heat exchangers in alignment being staggered relative to each other in such manner that the fins of one part of a first heat exchanger are interdigitated with those of a second heat exchanger, whereas the fins of the other part of the first heat exchanger are interdigitated with those of a third heat exchanger.

The interdigitated fins of two heat exchangers thus form a condenser connected in parallel to the element secured between these two heat exchangers, the capacity of which is determined by the surface area of the fins, their number, their spacing, and the dielectric constant of the cooling fluid employed for the heat exchangers.

Each heat exchanger is secured on an insulating bearer, which may have one or more conductive elements set into its depth or thickness and contingently on its opposite surface facing away from the metal components, the said element or elements being connected to earth or biased to a given potential.

By appropriate distribution of these conductive elements, it is possible to establish the capacity of each semiconductor element relative to earth or relative to a point kept at a given potential, and contingently the capacity between the turns of the chain formed by the semiconductor elements in series.

The rectifying combination may be surrounded by a screen connected electrically to one terminal of the said combination. The capacity between each element and this screen is a function of the distance between the outer part of the heat exchangers and the said screen, of the surface area of the said elements, and of the dielectric constant of the coolant employed for the said elements.

Finally, the coolant surrounding the rectifying combination forms an electrical resistance between the two heat exchangers coordinated with the same semiconductor element, this resistance being in parallel with the said semiconductor element, the value of this resistance being a function of the resistivity of the fluid employed.

A very great number of elements may thus be assembled in series in a rectifying combination of little bulk, providing convenient access, moreover, to any point of the chain formed by the elements in series, specifically in order to establish connections to control electrodes in cases in which thyristors are employed, and contingently in order to establish connections between different parts of the chain and complementary external resistances and/or capacitances for the purpose of improving distribution of the voltage between the different sections of the chain.

The invention will now be described in detail with reference to the accompanying drawings, which show two possible exemplary forms or embodiments of the device according to the invention.

Figure 3:
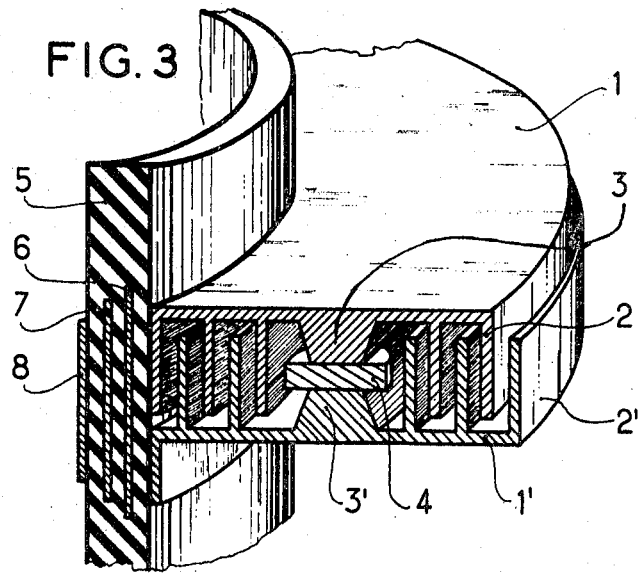
Figure 4:
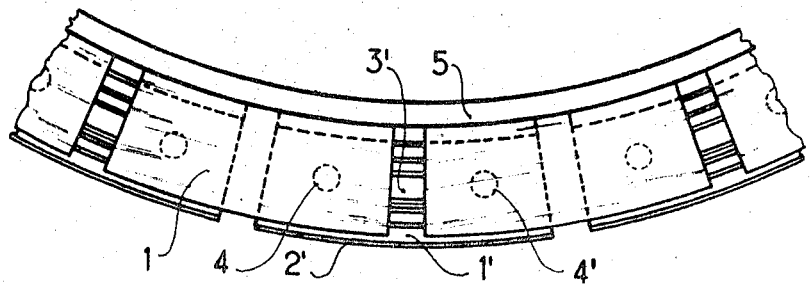
Figure 5:
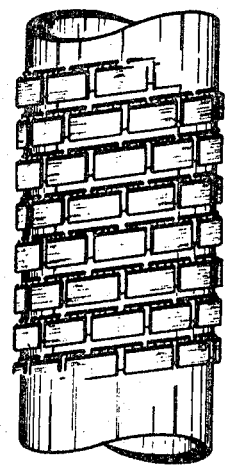
Figure 6:
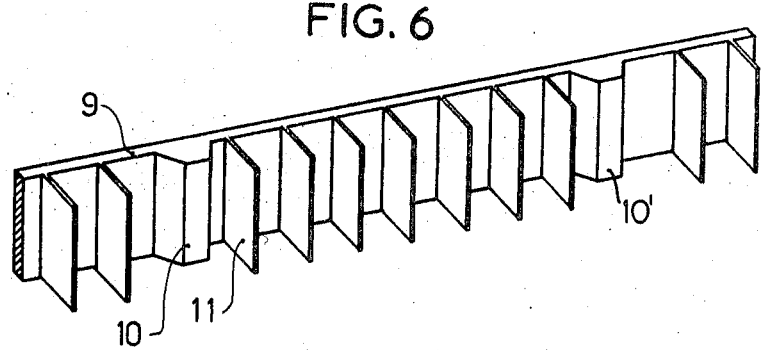
Figure 7:
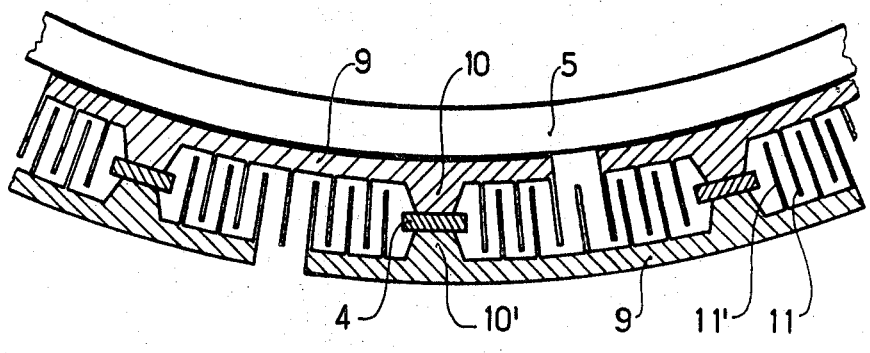
Figure 8:
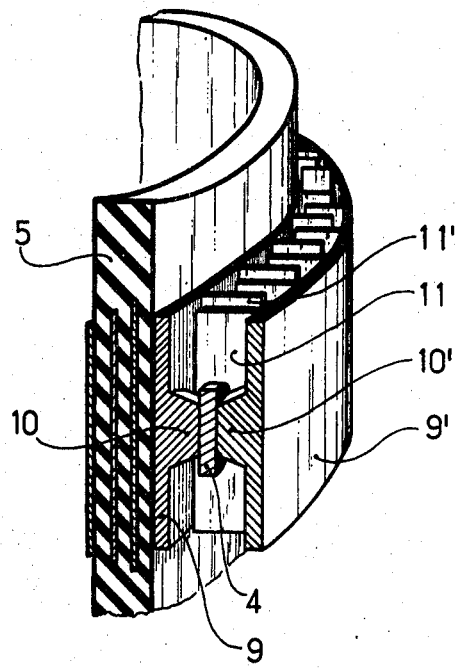

FIGURES 1 to 4 illustrate a first embodiment of the invention, in which the fins or webs of the heat exchangers are arranged along co-axial cylindrical sectors, FIGURE 5 is a perspective view of the helical combination, FIGURES 6 to 8 illustrate a second embodiment of the invention, in which the said fins or webs extend in radial longitudinal planes, the coolant then flowing along an axial direction.

SPECIFIC DESCRIPTION OF THE INVENTION

Figure 2:

FIGURE 1 is a partial view in perspective of a heat exchanger element, which will hereinafter be referred to as a "radiator," and the same heat exchanger element is shown in plan view from below in FIGURE 2. In these figures, the flat base 1 of the radiator bears a number of fins or webs 2 disposed on either side of a projection 3 against which one of the two faces of opposed polarity of two semiconductor elements is intended to bear.

FIGURE 3 shows two radiators 1 and 1' facing in opposite directions with their fins or webs 2 interdigitated and mounted on the periphery of a bearing cylinder 5 of insulating material in any conventional way with a semiconductor element 4 secured between the opposed projections 3 and 3' of the respective radiators. The insulating cylinder 5 may, for example, include two conductive plates or layers 6 and 7 embedded within its wall thickness, and a conductive plate or layer 8 on its inner surface. These different elements may be of different widths, and the analogous elements situated on the different turns of a helix formed by the said radiators around the insulating cylinder may be of different widths. By appropriate distribution of these conductive elements, it is possible to establish the capacity of each semiconductor element with respect to earth or a given potential.

FIGURE 4 illustrates the device as seen from below, showing the manner in which the radiators 1 and 1' are arranged to be intermeshing in continuous connection around the insulating cylinder 5, and it is apparent from this figure that each radiator 1 serves the purpose of securing and cooling two semiconductors such as 4 and 4' with adjacent semiconductor elements being inverted with respect to one another so that they present opposite polarity terminals in contact with a given radiator. As seen in FIGURE 5, the radiators extend continuously in the form of a helix on the periphery of the bearing cylinder 5.

FIGURES 6 to 8 illustrate another possible embodiment of the device according to the invention, comprising finned radiators, with the fins or webs extending in radial longitudinal planes. FIGURE 6 illustrates one element of a radiator of this nature, comprising a strip 9 bearing two projections 10 and 10' on one face, these projections being separated by sets of fins or webs 11. An element of this nature may be produced in the form of a section obtained by drawing or extrusion, from which lengths corresponding to the height required are cut at an angle corresponding to the angle of the helix along which the said element is to be applied on the said insulating cylinder.

FIGURE 7 shows the manner in which two elements such as 9 and 9' may be wound in helix form around an insulating cylinder 5, with their fins or webs 11 and 11' intermeshing and a semiconductor secured between the two projections 10 and 10', the semiconductor bearing the reference numeral 4.

FIGURE 8 shows a section taken through the device according to FIGURE 7, showing the angle of the helix along which the radiators are wound.

The invention is evidently not limited to the two embodiments described and illustrated, but encompasses all possible modifications within the scope of the invention, and the features apparent from the accompanying drawings are equally intended to be considered as forming part of the present invention.

We claim:

1. A power rectifying device for very high voltages, comprising a plurality of semi-conductor elements each having a cathode and an anode, and a plurality of heat exchanger units, each heat exchanger unit being in contact with the cathode of a first semi-conductor element and the anode of a second semi-conductor element, each heat exchanger unit comprising a plurality of fins arranged along co-axial cylindrical sectors, the fins of one part of a first heat exchanger element being interdigitated with those of a portion of a second heat exchanger element to effect substantial capacitive coupling therebetween, and the fins of the other part of the first exchanger element being interdigitated with those of a portion of a third heat exchanger element to effect substantial capacitive coupling therebetween.

2. A power rectifying device for very high voltages, comprising a plurality of semi-conductor elements each having a cathode and an anode, and a plurality of heat exchanger units, each heat exchanger unit being in contact with the cathode of a first semi-conductor element and the anode of a second semi-conductor element, each heat exchanger unit comprising a plurality of fins situated in radial longitudinal planes, the fins of one part of a first heat exchanger element being interdigitated with those of a portion of a second heat exchanger element to effect substantial capacitive coupling therebetween, and the fins of the other part of the first exchanger element being interdigitated with those of a portion of a third heat exchanger element to effect substantial capacitive coupling therebetween.

3. A power rectifying device according to claim 1, in which the heat exchanger units are secured along a helix on the periphery of a cylindrical insulating bearer, at least one conductive element being embedded within the wall of said insulating bearer.

4. A power rectifying device according to claim 3, in which the said heat exchanger elements which include radial fins consist of contoured strips of sections which are cut along an angle corresponding to that of the said helix along which the said exchanger is to be wound on the said cylindrical bearer.

5. A power rectifying device according to claim 3, in which the said cylindrical insulating bearer is hollow, and at least one conductive element is positioned on the internal surface of said insulating bearer opposite from that bearing the corresponding heat exchanger element.

6. A power rectifying device according to claim 2, in which the heat exchanger units are secured along a helix on the periphery of a cylindrical insulating bearer, at least one conductive element being embedded within the wall of said insulating bearer.

7. A power rectifying device according to claim 6, in which the said cylindrical insulating bearer is hollow, and at least one conductive element is positioned on the internal surface of said insulating bearer opposite from that bearing the corresponding heat exchanger element.

References Cited

UNITED STATES PATENTS

| 2,815,472 | 12/1957 | Jackson et al. | 317—234 |
| 3,234,451 | 2/1966 | Diebold | 321—8 |
| 3,293,508 | 12/1966 | Boyer | 317—234 |
| 3,319,136 | 5/1967 | Perry et al. | 317—234 |
| 3,333,163 | 7/1967 | Wislocky | 317—234 |
| 3,373,335 | 3/1968 | Rosenberg | 321—11 |

JOHN F. COUCH, Primary Examiner

W. H. BEHA, Jr., Assistant Examiner

U.S. Cl. X.R.

317—234; 321—11